No. 857,851. PATENTED JUNE 25, 1907.
J. P. WETHERILL.
AMUSEMENT DEVICE.
APPLICATION FILED OCT. 31, 1905.

2 SHEETS—SHEET 1.

WITNESSES:
W. E. Watson
W. C. Sharkey

INVENTOR
James P. Wetherill
BY
A. V. Groupe
ATTORNEY.

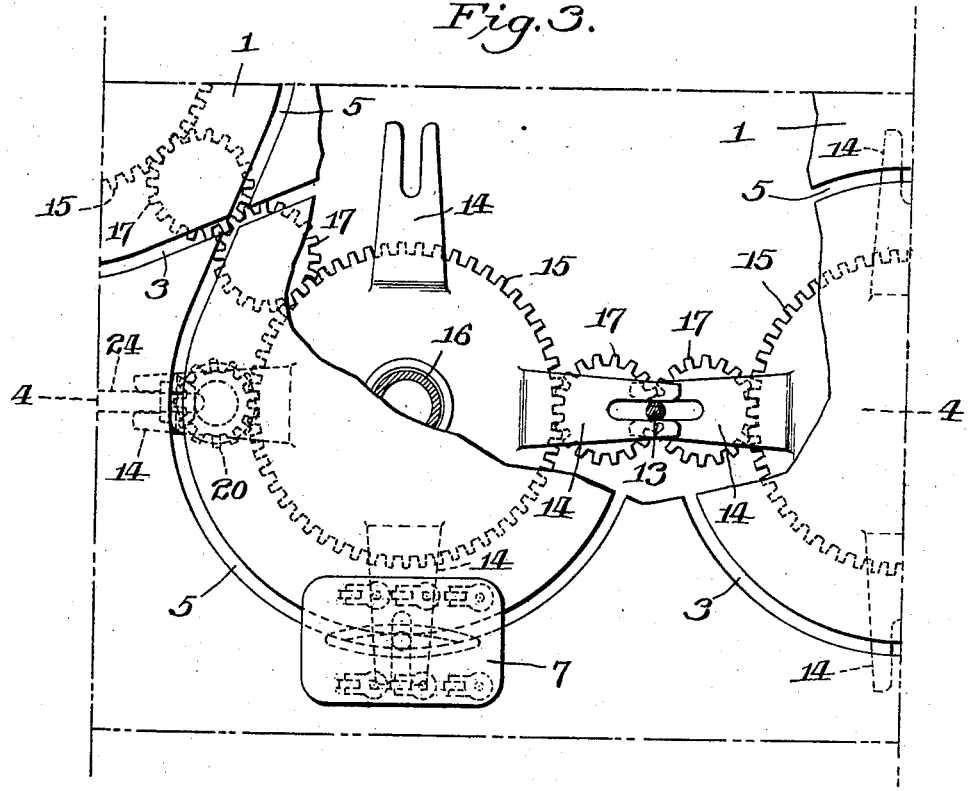
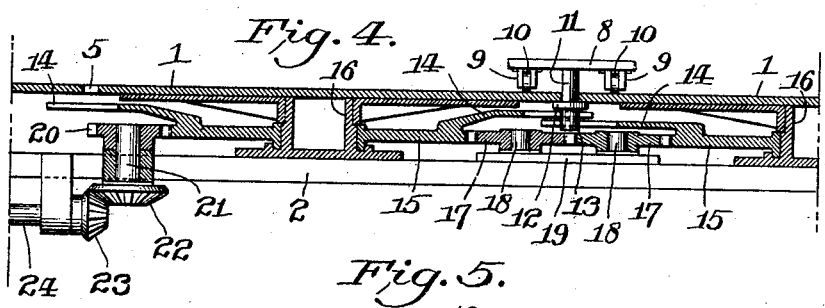
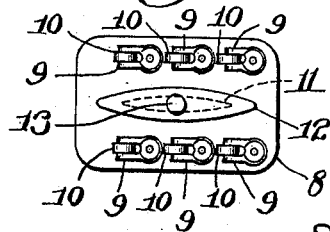

UNITED STATES PATENT OFFICE.

JAMES P. WETHERILL, OF CHESTER, PENNSYLVANIA.

AMUSEMENT DEVICE.

No. 857,851.  Specification of Letters Patent.  Patented June 25, 1907.

Application filed October 31, 1905. Serial No. 285,328.

*To all whom it may concern:*

Be it known that I, JAMES P. WETHERILL, a citizen of the United States, residing at Chester, in the county of Delaware and State of Pennsylvania, have invented certain new and useful Improvements in Amusement Devices, of which the following is a specification.

This invention relates to amusement devices, the object being to provide a simple and efficient construction and organization of mechanism whereby two set of carriages may be moved and guided in two intersecting, circular, sinuous courses in opposite direction to each other in a manner to cause the carriages of one set to pass the carriages of the other set first on the inside and then on the outside of the courses in alternate succession, the carriages being adapted to receive and carry bodies in the form of animals or other objects upon which persons may be seated.

A leading feature of the invention comprises a novel driving mechanism whereby the carriages may be moved through their guides.

Another feature of the invention comprises a novel construction of carriage in combination with its coacting parts.

The invention also comprises other novel features of construction and combination of parts which will be hereinafter fully described and claimed.

Figure 1:
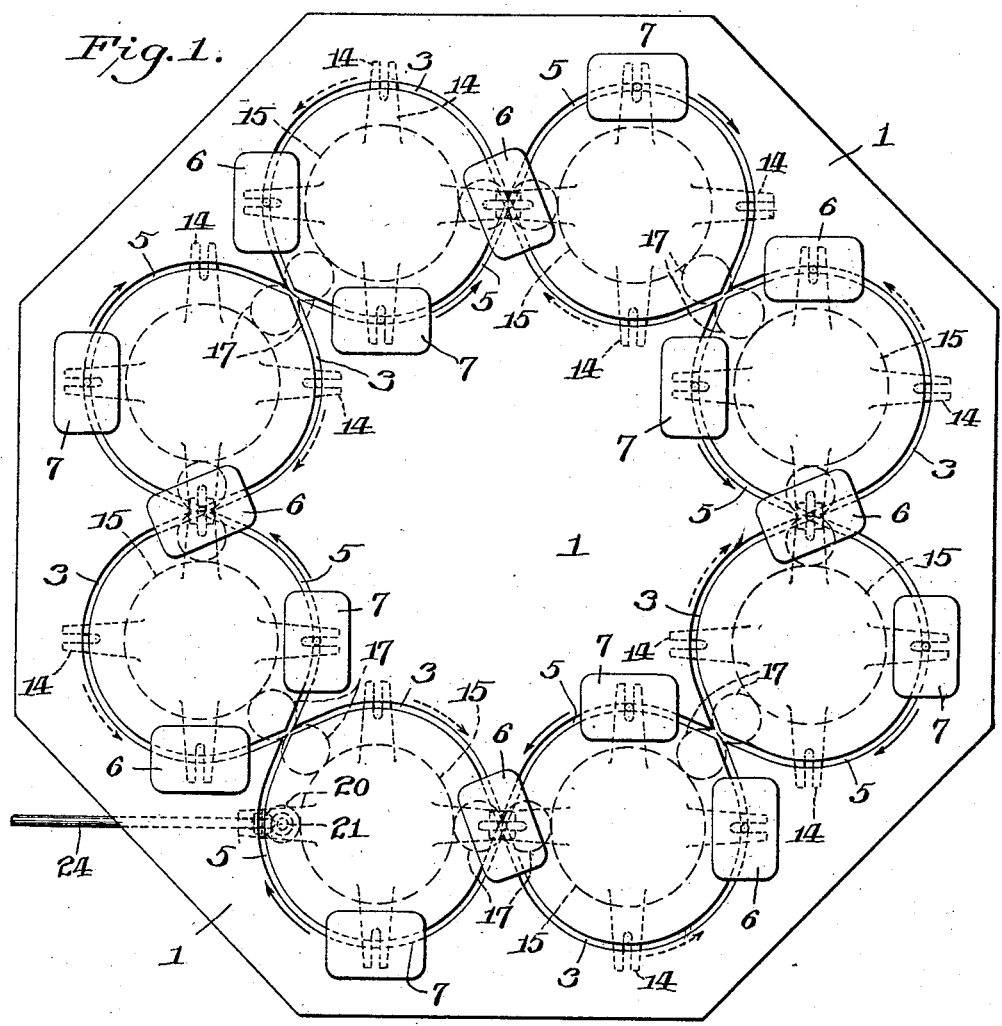
Figure 2:
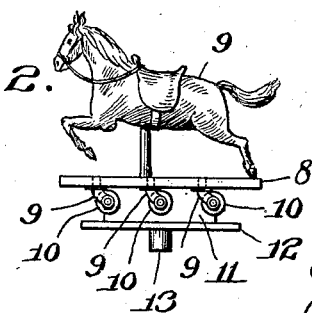

In the drawings:—Figure 1 is a plan view of an amusement device embodying my invention, the carriages thereof having the bodies in the form of animals and other objects removed therefrom. Fig. 2 is a side elevation of one of the carriages detached and having mounted thereon a body in the form of a horse adapted to receive a person. Fig. 3 is a plan view, partly broken away, of a section of the device shown in Fig. 1. Fig. 4 is a vertical section, as on the line 4—4 of Fig. 3, including the broken away parts. Fig. 5 is a view of the bottom of one of the carriages.

1 designates a platform which is suitably supported above a base or foundation 2. The platform 1 is provided with two circular sinuous guide slots 3 and 5 which intersect each other, as clearly shown in Fig. 1. Arranged upon the platform 1 are two sets of carriages 6 and 7 adapted to be guided by the slots 3 and 5, respectively. Each carriage of each set is of the following construction:—8 designates a flat body adapted to receive and support bodies in the form of animals or other objects upon which persons may be seated, such for example, as the form of a horse, 9, shown in Fig. 2. Beneath the body 8 and pivotally connected thereto are members 9 provided with rollers 10 adapted to roll upon the platform 1 and support the carriage. The pivotal connection of the members 9 with the body 8 is forwardly of the axes of the rollers 10, to the end that during the travel of the carriage through its sinuous course, the rollers will assume positions with their axes at right angles to the direction of movement of their pivoted connections. Depending from the body of each carriage and through the underlying slot is a guiding member 11 adapted to take against the side walls of the slot to guide the carriage. The length of the member 11 is greater than the width of the slot to prevent its turning therein and to direct the carriage forwardly through the course controlled by the slot. The bottom of the member 11 is provided with a plate 12 to engage the bottom of the platform 1 and prevent upward movement of the carriage. Projecting downwardly from each plate 12 or carriage is a pin 13 adapted to be engaged by the forked ends of arms 14 extending radially from horizontally arranged gear wheel 15 which are journaled on hollow shafts 16 extending between the base 2 and the platform 1. The shaft 16 also form supports for the platform 1 between the slots 3 and 5.

It will be observed that the gear wheels 15 are equidistantly arranged around the intersecting sinuous courses and that the slots 3 and 5 extend directly above the paths traversed by the forked ends of the arms. Arranged between each two adjacent gear wheels 15 and in mesh therewith are two coacting pinions 17 whereby power may be transmitted from one gear wheel to the other and each gear wheel 15 rotated reversely of the next adjacent gear wheel 15. The pinions 17 are journaled on stud shafts 18 projecting upwardly from brackets 19 mounted on the base 2. Each gear wheel 15 carries four arms 14 and the arms of one wheel 15 extend slightly above the arms of the next adjacent wheel 15 whereby one arm will pass over the other, and the arms 14 are so arranged that during the rotation of the gear wheels 15 the forked ends of the arms 14 come into register with each other, one above the other. Thus it will be seen that the arms 14 engage the pins to move the carriages 6 and 7, and that each pin 13 passes from the forked end of an arm of one wheel 15 to the forked end of an arm of the next wheel 15 thereby moving the carriages 6 the direction of the dotted line arrows, guided by the slot 3, and the carriages 7 in the direction of the full line arrows, guided by the slot 5.

In mesh with one of the gear wheels 15 is a pinion 20 on the upper end of a shaft 21 journaled in a bearing on the base 2. The lower end of this shaft 21 is provided with a bevel gear wheel 22 which coacts with a similar wheel 23 on one end of a shaft 24 to which power may be applied to actuate the gear wheels 15.

The carriages 6 and 7 are so spaced around the slots 3 and 5 and the movement of the carriages 6 are so timed with relation to the movement of the carriages 7 that the carriages 6 and 7 pass and re-pass each other first on the inside and then on the outside of their courses in alternate succession.

It will of course be understood that bodies in the form of various animals or various devices of any kind may be employed upon the carriages.

I claim:—

1. In an amusement device, the combination of a platform provided with a sinuous guide slot, a carriage above the platform, members pivotally connected to the carriage and carrying rollers adapted to support the carriage upon the platform, a guiding member depending from the carriage and through the slot, said member being of a length greater than the width of the slot, and means for moving the carriage.

2. In an amusement device, the combination of a platform provided with a sinuous guide slot, a carriage mounted on the platform, a guiding member depending from the carriage and through the slot, gear wheels provided with means adapted to engage said member to move the carriage, and a pair of coacting pinions between each two adjacent gear wheels to transmit power from one to the other.

3. In an amusement device, the combination of a platform provided with a sinuous guide slot, a carriage above the platform, members pivotally connected to the carriage laterally of said slot, rollers on said members, and resting upon the platform away from the slot therein, a guiding member depending from the carriage and through the slot, said guiding member being of a length greater than the width of the slot, and means for moving the carriage.

4. In an amusement device, the combination of a platform provided with a sinuous guide slot, a carriage above the platform, members pivotally connected to the carriage laterally of said slot, rollers on said members and resting upon the platform away from the slot therein, said rollers being arranged rearwardly of the pivotal connection of the members with the carriage, a guiding member depending from the carriage and through the slot, said guiding member being of a length greater than the width of the slot, and means for moving the carriage.

In testimony whereof I affix my signature in presence of two witnesses.

JAMES P. WETHERILL.

Witnesses:
S. G. DOYLE,
A. V. GROUPE.